US010539674B2

(12) United States Patent
Frick et al.

(10) Patent No.: US 10,539,674 B2
(45) Date of Patent: Jan. 21, 2020

(54) SYSTEM AND METHOD FOR TRACKING A SLING LOAD AND TERRAIN WITH A RADAR ALTIMETER

(71) Applicant: Honeywell International Inc., Morris Plains, NJ (US)

(72) Inventors: Seth T. Frick, Saint Paul, MN (US); David C. Vacanti, Renton, WA (US); Todd R. Burlet, Maple Grove, MN (US)

(73) Assignee: Honeywell International Inc., Morris Plains, NJ (US)

( * ) Notice: Subject to any disclaimer, the term of this patent is extended or adjusted under 35 U.S.C. 154(b) by 236 days.

(21) Appl. No.: 15/670,764

(22) Filed: Aug. 7, 2017

(65) Prior Publication Data

US 2019/0041510 A1 Feb. 7, 2019

(51) Int. Cl.
*G01S 13/88* (2006.01)
*G01S 13/32* (2006.01)
*G01S 7/35* (2006.01)

(52) U.S. Cl.
CPC ............ *G01S 13/882* (2013.01); *G01S 7/352* (2013.01); *G01S 13/32* (2013.01)

(58) Field of Classification Search
CPC ........ G01S 13/882; G01S 7/411; G01S 13/34; G01S 7/352; G01S 13/32
USPC .......................................... 342/122, 174, 157
See application file for complete search history.

(56) References Cited

U.S. PATENT DOCUMENTS

| 4,509,049 A | 4/1985 | Haendel et al. |
| 4,568,938 A | 2/1986 | Ubriaco |
| 4,599,618 A | 7/1986 | Haendel et al. |
| 4,670,753 A | 6/1987 | Vacanti |
| 4,737,791 A | 4/1988 | Jean |
| 4,766,436 A | 8/1988 | Crepin et al. |
| 4,847,623 A | 7/1989 | Jean |
| 4,958,161 A | 9/1990 | Allezard |
| 5,046,010 A | 9/1991 | Tomasi |
| 5,448,241 A | 9/1995 | Zeoli |
| 5,477,226 A | 12/1995 | Hager et al. |
| 5,646,623 A | 7/1997 | Walters et al. |
| 5,923,283 A | 7/1999 | Gouenard |
| 5,999,118 A | 12/1999 | Hethuin |
| 6,072,422 A | 6/2000 | Yamada |

(Continued)

FOREIGN PATENT DOCUMENTS

| DE | 19632889 | 2/1998 |
| DE | 19935265 | 2/2001 |

(Continued)

OTHER PUBLICATIONS

European Patent Office, "Extended European Search Report from EP Application No. 14184291.4 dated Mar. 20, 2015", "from Foreign Counterpart of U.S. Appl. No. 14/038,414", Mar. 20, 2015, pp. 1-8, Published in: EP.

(Continued)

*Primary Examiner* — Bo Fan
(74) *Attorney, Agent, or Firm* — Fogg & Powers LLC

(57) ABSTRACT

A method and apparatus are provided to determine a range of a sling load from a vehicle. In one embodiment, an FMCW RADAR altimeter generates an altitude history image that is used to determine the range of the sling load from the vehicle and an altitude of the vehicle.

20 Claims, 3 Drawing Sheets

(56) References Cited

U.S. PATENT DOCUMENTS

| | | | |
|---|---|---|---|
| 6,307,500 | B1 | 10/2001 | Cornman |
| 6,426,717 | B1 | 7/2002 | Maloratsky |
| 6,977,611 | B1 | 12/2005 | Crabb |
| 7,095,364 | B1 | 8/2006 | Rawdon et al. |
| 7,161,527 | B2 | 1/2007 | Vacanti |
| 7,239,266 | B2 | 7/2007 | Vacanti |
| 7,295,150 | B2 | 11/2007 | Burlet et al. |
| 7,825,851 | B2 | 11/2010 | Vacanti |
| 8,115,672 | B2 | 2/2012 | Nouvel et al. |
| 9,678,197 | B2 | 6/2017 | Vacanti |
| 2005/0253750 | A1 | 11/2005 | Hager et al. |
| 2006/0044182 | A1 | 3/2006 | Vacanti |
| 2006/0049977 | A1 | 3/2006 | Vacanti |
| 2006/0074558 | A1* | 4/2006 | Williamson ......... G01C 21/165 701/469 |
| 2006/0089759 | A1 | 4/2006 | Becker |
| 2012/0154234 | A1 | 6/2012 | Geiler et al. |
| 2013/0214963 | A1 | 8/2013 | Vacanti |
| 2013/0214964 | A1 | 8/2013 | Holt |
| 2014/0022113 | A1 | 1/2014 | Nogueira-Nine |
| 2014/0139366 | A1* | 5/2014 | Moses ................ G01S 13/9303 342/27 |
| 2015/0084808 | A1* | 3/2015 | Vacanti .................... G01S 7/41 342/122 |
| 2016/0097848 | A1 | 4/2016 | Jehamy |
| 2017/0010350 | A1 | 1/2017 | Winstead |

FOREIGN PATENT DOCUMENTS

| | | |
|---|---|---|
| EP | 0251387 | 1/1988 |
| EP | 0376374 | 7/1990 |
| EP | 2189809 | 5/2010 |
| EP | 2631666 | 8/2013 |
| FR | 2984521 A1 | 6/2013 |
| WO | 2006080942 | 8/2006 |

OTHER PUBLICATIONS

United States Patent and Trademark Office, "Final Office Action", "From U.S. Appl. No. 14/038,414", dated Feb. 8, 2016, pp. 1-18, Published in: US.

United States Patent and Trademark Office, "Final Office Action", "From U.S. Appl. No. 14/038,414", dated Nov. 2, 2016, pp. 1-19, Published in: US.

United States Patent and Trademark Office, "Office Action", "From U.S. Appl. No. 14/038,414", dated Aug. 18, 2015, pp. 1-26, Published in: US.

United States Patent and Trademark Office, "Office Action", "From U.S. Appl. No. 14/038,414", dated May 13, 2016, pp. 1-18, Published in: US.

European Patent Office, "Communication Pursuant to Article 94(3) for EP Application No. 08103511.5", "Foreign Counterpart to U.S. Appl. No. 12/061,478", dated Oct. 16, 2009, pp. 1-4, Published in: EP.

European Patent Office, "Communication Pursuant to Article 94(3) for EP Application No. 08103511.5", "Foreign Counterpart to U.S. Appl. No. 12/061,478", dated Aug. 26, 2010, pp. 1-4, Published in: EP.

European Patent Office, "European Search Report for EP Application No. 08103511.5", "Foreign Counterpart to U.S. Appl. No. 12/061,478", dated Aug. 11, 2009, pp. 1-3, Published in: EP.

United States Patent and Trademark Office, "Office Action", "From U.S. Appl. No. 12/061,478", dated Mar. 17, 2010, pp. 1-13, Published in: US.

Guhua Liu et al., "The Research of Signal Processing Technique of Continous Wave Radar Altimeter", "Radio Science Conference 2004", Aug. 24-27, 2004, pp. 173-176, Publisher: IEEE.

Choi et al., "Design of an FMCW Radar Altimeter for Wide-Range and Low Measurement Error", "Transactions on Instrumentation and Measurement", Dec. 2015, pp. 3517-3525, vol. 64, No. 12, Publisher: IEEE.

Kuang et al., "A New Algorithm for Long Range FMCW Radar Altimeter", "ChinaSIP 2013", 2013, pp. 621-625, Publisher: IEEE.

Raney, "The Delay/Doppler Radar Altimeter", "IEEE Transcations on Geoscience and Remote Sensing", Apr. 1, 1997, pp. 1578-1588, vol. 36, No. 5, Publisher: IEEE.

Stumpf et al., "A Novel FMCW Radar Altimeter Design Capable of Achieving Fine Range Accuracy Needed for Autonomous UAV Operation", Jul. 2013, pp. 1-50, Publisher: University of Kansas.

Williams, "Evaluating the State Probabilities of M Out of N Sliding Window Detectors", Feb. 1998, pp. 1-25, Publisher: DSTO Aeronautical and Maritime Research Labratory, Published in: Commonwealth of Australia.

European Patent Office, "Extended European Search Report for EP Application No. 18186732.6, dated Dec. 14, 2018", Foreign Counterpart to U.S. Appl. No. 15/670,764, pp. 1-9.

\* cited by examiner

SYSTEM AND METHOD FOR TRACKING A SLING LOAD AND TERRAIN WITH A RADAR ALTIMETER

BACKGROUND

Airborne vehicles, such as helicopters and vertical and/or short take-off and landing (V/STOL) may be used to carry, e.g. hanging by wires, cargo hanging beneath the body or fuselage of the vehicle. Such cargo may be referred to as a slung load or a sling load. If the airborne vehicle utilizes a RAdio Detection and Ranging (RADAR) altimeter to measure the vehicle's height above terrain, the sling load can interfere with the operation of the RADAR altimeter by presenting a false indication of range to, or height above terrain. RADAR altimeter may also be referred to as a Radio Altimeter.

Complex techniques have been proposed to avoid such a false indication, such as by adjusting the direction of the emitted RADAR altimeter signal, desensitizing a portion of the signal return resulting from the sling load, or placing a passive modulator on the sling load to indicate its presence. A RADAR altimeter signal return, or return signal, may otherwise be referred to herein as a reflected signal.

These techniques are either costly to implement and/or may affect the ability of the RADAR altimeter to accurately detect the height above terrain. Therefore, there is a need for a cost-effective RADAR altimeter that does not diminish the accuracy or sensitivity when measuring height above terrain in the presence of a sling load.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

A method is provided. The method comprises: emitting a transmit signal for a single modulation period; receiving reflected signals for the single modulation period; generating intermediate frequency (IF) signals from the received reflected signals and the transmit signal; digitizing the IF signals; performing a discrete Fourier transformation of the digitized IF signals; generating a series of bins where each bin corresponds to a unique range gate for the single modulation period; performing threshold detection for each bin in the series of bins so that each bin is classified as a detection or a non-detection bin; storing the set of detection and non-detection bins in an altitude history image; determining if K sets of detection and non-detection bins have been saved; if K sets have been saved, then determining if a sling load mode is enabled; if the sling mode has not been enabled, then: determining a set of bins, corresponding to a unique range gate but different modulation periods, wherein the unique range gate corresponds to the vehicle's range to a surface; and determining an altitude of the vehicle above the surface; and if the sling mode has been enabled, then: determining a set of bins, corresponding to a unique range gate but different modulation periods, wherein the unique range gate corresponds to a range from the vehicle to the sling load; determining if the range to the surface from the vehicle equals the range to the sling load from the vehicle; and if the range to the surface from the vehicle does not equal the range to the sling load from the vehicle, then determining vehicle altitude.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

Figure 1:
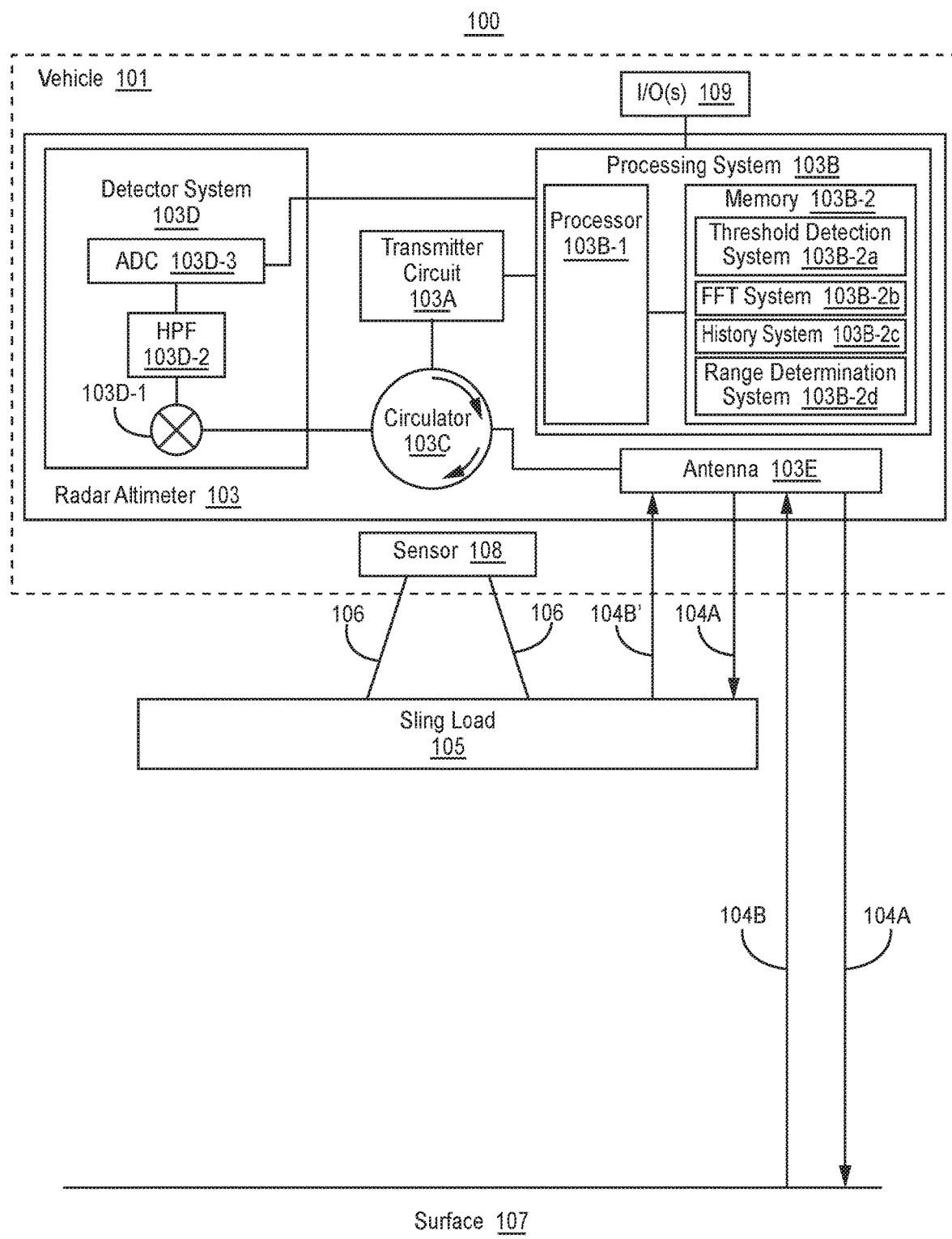
FIG. 1 illustrates one embodiment of a vehicle, carrying a sling load, above a surface.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention are configured to use an altitude history image derived from return signals received by a RADAR altimeter of a vehicle to determine the vehicle's altitude above a surface, and if a sling load is attached to the vehicle, a range from the vehicle to the sling load. Vehicle shall mean any type of vehicle capable of carrying a sling load, including without limitation a helicopter, and a vertical and/or short take-off and landing aircraft (V/STOL). Further, the embodiments are configured to facilitate analyzing RADAR return signals corresponding to a range of discrete altitudes from minimum to maximum, and selecting two sets of bins in the altitude history image, wherein the bins correspond to RADAR return signals. The first set of bins corresponds to a range, closer to the vehicle, of the sling load from the vehicle. The second set of bins corresponds to a range, further from the vehicle, of the surface from the vehicle, and thus the altitude of the vehicle. The selection of the two sets of bins facilitates ignoring intermediate results caused by weather and/or obstructions such as rain, buildings, trees, and other vehicles.

One embodiment is implemented using a frequency modulated (FM) continuous wave (CW) RADAR altimeter (a FMCW RADAR altimeter) with a fixed modulation rate (and periods), and discrete Fourier transform processing of each individual modulation period. For pedagogical purposes, discrete Fourier transform will be subsequently exemplified by a fast Fourier transform. The amplitude of each RADAR return signal corresponding to each of a series of range gates for each successive modulation period is threshold detected and saved, e.g. as part of an altitude image history. Each range gate corresponds to a range of distances which is the resolution of the FMCW RADAR altimeter, the resolution of each range gate being constant to the fixed modulation rate. In alternate embodiments, the modulation rate may not be fixed, e.g. may vary depending upon whether a sling load mode is enabled in the FMCW RADAR altimeter.

The altitude image history is then evaluated to determine the vehicle's altitude. An exemplary FMCW RADAR altimeter utilizing this technique is illustrated in U.S. Pat. No. 7,825,851, which is hereby incorporated by reference in its entirety.

However, the embodiments disclosed herein are also configured to determine the range from the vehicle to a sling load. Upon receipt of a sling mode enablement signal, a range of the sling load from the vehicle is determined. The altitude of the vehicle is also determined.

FIG. 1 illustrates one embodiment of a vehicle, carrying a sling load, above a surface 100. The vehicle 101 includes a RADAR altimeter 103 for detecting the distance of the sling load 105 from the vehicle 101, and the altitude of the vehicle 101 above the surface 107. In another embodiment, the surface is the surface of the Earth.

The RADAR altimeter 103 is coupled to at least one input/output device (I/O(s)) 109. In one embodiment, the I/O 109 is a display (such as a touch screen display), a cursor control device (such as a mouse or a joystick), a keyboard, a switch, a microphone and a voice recognition system, and/or a speaker and a voice synthesizer. In another embodiment, the I/O(s) 109 provide, e.g. display, the distance of the sling load 105, and the altitude of the vehicle 101 above the surface 107; such data is provided by I/O(s) 109 and the RADAR altimeter 103, e.g. to an operator (such as a pilot, of the vehicle 101) or a system (such as an electronic control system). In a further embodiment, the operator, e.g. the pilot, of the vehicle 101 indicates, with the I/O(s) 109 (for example by activating a switch) that a sling load 105 is attached to the vehicle 101; as a result, a sling mode enablement signal is generated by the I/O 109, and transmitted to the RADAR altimeter 103 indicating that a sling load 105 is attached to the vehicle 101. In a further embodiment, the vehicle 101 includes a sensor circuit 108 coupled to the RADAR altimeter 103. The sensor circuit 108 detects whether a sling load 105 is attached to the vehicle 101, and provides a sling mode enablement signal to the processing system 103B indicating that a sling load 105 is attached to the vehicle 101. In yet another embodiment, the sensor circuit 108 can be one or more strain gauges, e.g. coupled to support devices 106, e.g. wires, which attach the sling load 105 to the vehicle 101.

In the embodiment illustrated in FIG. 1, the RADAR altimeter 103 is a FMCW RADAR. As illustrated, the RADAR altimeter 103 includes a transmitter circuit 103A that generates and transmits a signal (transmit signal) 104A that is frequency modulated (FM) continuous wave (CW) signal. In another embodiment, the transmitter circuit 103A includes a FMCW signal generator circuit, e.g. which generates a radio frequency (RF) CW signal having a repetitively ramped frequency. Each instance of the repetitive modulation cycle shall be referred to as modulation period.

The FMCW signal, generated by the FMCW signal generator circuit, is coupled to a power amplifier which power amplifies the RF FMCW signal. In a further embodiment, the transmitter circuit 103A is coupled to a processing system 103B. In yet another embodiment, the processing system 103B controls the frequency modulation, e.g. periodicity and/or rate of ramp, of the CW signal.

The surface 107 and the sling load 105 reflect the transmit signal 104A generating respectively a surface reflected signal 104B and a sling load reflected signal 104B'. There may be other reflected signals that are reflections from other objects such as other vehicles, buildings, and trees.

In one embodiment, for each modulation period, the frequency ramp of the transmit signal 104A varies linearly with time, allowing the distance to the ground to be determined by taking the instantaneous difference between the frequency of current transmit signal and received reflected signals. Further, the linear FMCW modulation rate is fixed to produce a constant altitude resolution at all range gates.

A detector system 103D is coupled to the transmitter circuit 103A, e.g. directly and/or through a circulator 103C, receiving a portion of the transmit signal 104A (before it is emitted by an antenna). The detector system 103D subtracts the reflected signals from the transmit signal 104A to produce frequencies that are directly proportional to range of object(s) from the vehicle from which the transmit signal 104 was reflected, including, e.g. the range from the vehicle 101 to the sling load 105 and the surface 107. The range from the vehicle 101 to the surface 107 corresponds to the altitude of the vehicle 101 above the surface 107.

In the illustrated embodiment, the transmitter circuit 103A and detector system 103D are coupled to a circulator 103C. The circulator 103C couples the transmit signal 104A from the transmitter circuit 103A to an antenna 103E which emits the transmit signal 104A. The antenna 103E receives the reflected signals (such as the surface reflected signal 104B and/or the sling load reflected signal 104B') which are coupled from the antenna 103E to the detector system 103D by the circulator 103C. In one embodiment, the antenna 103A may be one of or a combination of a patch antenna, a patch array antenna, a horn antenna, a slotted waveguide antenna, and/or a phased array antenna. A patch antenna consists of a single patch of metal mounted on an insulator over a ground plane. A patch array comprises two or more of such patches coupled by a transmission line signal distribution network. In another embodiment, the antenna 103B is covered by a radome to protect the antenna 103A and any other components of the RADAR altimeter 103 from the environment.

In an alternative embodiment, no circulator 103C and no single antenna 103E are used. Rather, the transmitter circuit 103A and the detector system 103D are coupled to separate, respective transmit and receive antennas. The transmit antenna emits the transmit signal, and the receive antenna receives the reflected signals. The transmit and receive antennas may be implemented, e.g. with the antenna types described above.

One embodiment of the detector system 103D, illustrated in FIG. 1, shall now be described. The detector system 103D includes a mixer circuit 103D-1 which receives, through the circulator 103C, a portion of the transmit signal 104A (which serves as the local oscillator signal input to the mixer circuit 103D-1) and the reflected signals (which serve as the RF signal input to the mixer circuit 103D-1). A mixer circuit comprises one or more non-linear circuit components, such as diodes and/or transistors.

The mixer circuit 103D-1 generates, at its output, IF signals, including sum and difference products of the transmit signal 104A and the reflected signals, for each modulation period. In another embodiment, the mixer circuit 103D-1 includes a low pass filter to suppress the sum products, so that only the difference products are provided at its output. In a further embodiment, the mixer circuit 103D-1 includes a low noise amplifier that couples the mixer circuit 103D-1 to an antenna, and increases the sensitivity of the detector system 103D.

For the reasons subsequently described, the illustrated embodiment does not include an automatic gain control loop following the output of the mixer circuit 103D-1. Rather, a high pass filter (HPF) 103D-2 is coupled to the output of the mixer 103D-1. The high pass filter 103D-2 is designed to filter the IF signals so that they have a constant amplitude from the lowest to the highest frequencies (respectively corresponding to the minimum and maximum range of the RADAR altimeter 103). As a result, IF signals, filtered by the high pass filter 103D-2, will not vary significantly in amplitude, regardless of range, for a target having a fixed RADAR cross section. Amplitude will only vary with respect to RADAR cross section of target(s), or equivalently, with respect to the RADAR reflectivity of the terrain surface. In one embodiment, the frequency response of the high pass filter 103D-2 increases twenty decibels per octave over the frequencies corresponding to the full altitude detection range of the altimeter. In another embodiment, the high pass filter 103D can be implemented by one or more stages of active or passive Butterworth, Chebyshev, and/or elliptic filters.

An analog to digital converter 103D-3 is coupled to the output of the high pass filter 103D-2. The analog to digital converter 103D-3 digitizes the high pass filtered IF signal. The analog to digital converter 103D-3 has a dynamic range at least equal to the range of the RADAR cross sections that the RADAR altimeter is designed to detect based on desired sensitivity performance.

Alternatively, the previously discussed high pass filter can be implemented after the analog to digital converter 103D-3, in the processing system 103B, e.g. with a digital filter. However, this embodiment would require an analog to digital converter having a much greater dynamic range, and thus would be significantly costlier.

As a result of the foregoing design, the processing system 103B implements a threshold detection system 103B-2a, subsequent to the high pass filter 103D-2, that only requires a fixed minimum signal to noise ratio to identify a detection of a reflected signal in a range gate. Therefore, an automatic gain control system is not needed. In one embodiment, the I/O(s) 109 are coupled to the processing system 103B.

In the illustrated embodiment, the processing system 103B includes a processor 103B-1 coupled to a memory 103B-2. The processor 103B-1 may be a central processing unit and/or a digital signal processor. The memory 103B-2 may be random access memory, programmable read only memory, flash memory, and/or a magnetic memory. However, the processing system can be implemented in whole or in part with a field programmable gate array and/or a state machine. For example, the processor 103B-1 and memory 103B-2 may be replaced by the field programmable gate array and/or the state machine. Thus, the field programmable gate array and/or the state machine would include the components described below as being contained within the memory 103B-2.

The memory 103B-2 includes a threshold detection system 103B-2a, a fast Fourier transform (FFT) system 103B-2b, a history system 103B-2c, and a range determination system 103B-2d. In one embodiment, the threshold detection system 103B-2a, the fast Fourier transform system 103B-2b, the history system 103B-2c, and the range determination system 103B-2d are executed or processed by the processor 103B-1. In another embodiment, the fast Fourier transform system 103B-2b can be alternatively be implemented in a standalone processor.

In one embodiment, the FFT system 103B-2b computes, substantially in real time, a fast Fourier transform of all reflected signals in a single modulation period. The output of the fast Fourier transform system 103B-2b is a set, e.g. a row, of bins with each bin corresponding to a particular range of distances from the RADAR altimeter 103. Each bin corresponds to a range gate of the RADAR altimeter 103. In one embodiment, each range gate has a resolution of about three feet. Thus, the number of bins in a set depends upon the maximum range of the RADAR altimeter 103 and the range gate resolution.

The threshold detection system 103B-2a determines whether the IF signal in each bin of a set exceeds a threshold level, e.g. a certain number of decibels above the detector system 103D noise floor. In one embodiment, such a threshold is chosen by the RADAR altimeter designer, and stored in the processing system 103B such as in the threshold detection system 103B-2a. In another embodiment, if the IF signal in the bin exceeds the threshold level, the threshold detection system 103B-2a assigns a binary value of one to that bin; if the IF signal in the bin does not exceed the threshold level, the threshold detection system 103B-2a assigns a zero to that bin.

Each threshold detected set of bins, corresponding to a unique modulation period, is stored in the history system 103B-2c. In one embodiment, the history system 103B-2c is a block of memory of a size sufficient to store a certain number, K, of threshold detected sets, e.g. rows, of bins, where each bin has a value of zero or one. Each threshold detected set corresponds to a unique modulation period. Thus, the K sets correspond to K modulation periods. In another embodiment, the K modulation periods are successive modulation periods. In one embodiment K equals forty.

The K threshold detected sets of bins are stored in the history system 103B-2c before further analysis is performed. Thus, a matrix or array of threshold detected bins is created representing a short history of substantially real time reflected signal measurements. The short history may also be referred to as an altitude history image. One axis, e.g. the columns, of the array are the range gates. The other axis, e.g. the rows, of the array are the modulation periods.

An altitude history image is created by the processing system 103B by generating range gates for each modulation period in the altitude history image. The altitude history image is stored in the history system 103B-2.

Upon the K threshold detected sets of bins being stored in the history system 103B-2c, the range determination system 103B-2d determines the distance of the sling load 105 from the vehicle 101, and/or the distance of the vehicle 101 from the surface 107 (and the altitude) based upon IF signals corresponding to reflected signals respectively from the sling load 105 and/or the surface 107. Embodiments of determining such distance(s) will be subsequently described.

Thereafter, in one embodiment, repeatedly, the RADAR altimeter 103 discards all of the data in the altitude history image, and repeats the process of generating and storing threshold detected sets of bins in the altitude history image. Alternatively, in another embodiment, the threshold detected set(s) of bins corresponding to the oldest modulation period is discarded, and a newly generated threshold detected set(s) of bins is added to the altitude history image. The number of set(s) may vary, and in a further embodiment is one. After bins are discarded and added, the range determination system 103B-2d again determines the distance of the sling load 105 from the vehicle 101, and/or the distance of the vehicle 101 from the surface 107 (and the altitude), based upon IF signals corresponding to reflected signals respectively from the sling load 105 and/or the surface 107. The range determination system 103B-2d uses, for example, one of the detection techniques that will be subsequently described.

Figure 2:
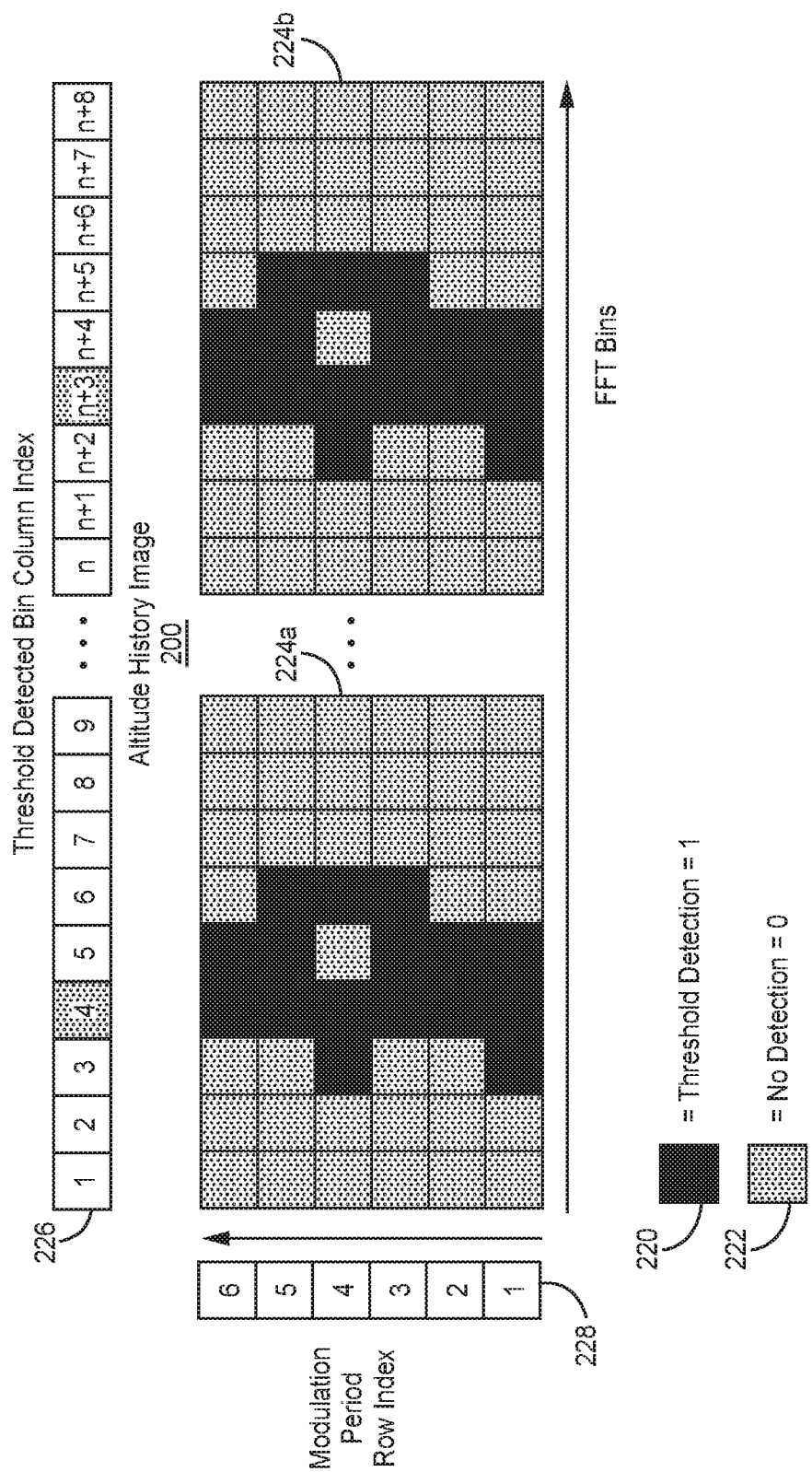
FIG. 2 illustrates one embodiment of an altitude history image.

FIG. 2 illustrates one embodiment of an altitude history image 200. In one embodiment, the altitude history image 200 is stored in the history system 103B-2c.

The illustrated altitude history image 200 is arbitrary in nature, and provided solely for pedagogical reasons. FIG. 2 includes a modulation period row index 228, a threshold detected bin column index 226, and a key for a dark box 220 and a light box 222; however, they are included for illustrative purposes and are not part of the exemplary altitude history image 200.

The illustrated altitude history image 200 comprises six rows, and a first set of nine columns (first set) 224a and a second set of nine columns (second set) 224b. The altitude history image 200 is a representation of range gated IF signals of the RADAR altimeter 103 over the course of a number of modulation periods.

The columns represent range gates for a single modulation period. The rows represent different modulation periods. Because the orientation of the X and Y axes of the altitude history image are arbitrary, the terms columns and rows shall not be limited with respect to a single orientation of the altitude history image 200. Columns and rows are more generally referred to herein as sets of bins, or sets of threshold detected bins, with respect to either a range gate or a modulation period. However, the terms rows and columns are used for pedagogical reasons to facilitate an understanding of the altitude history image 200 illustrated in FIG. 2.

Each square in the illustrated altitude history image 200 represents a threshold detected bin (corresponding to a unique range gate and a unique modulation period) for which thresholding was performed. The threshold detected bins having values above the threshold are assigned a binary value of one, and are indicated by a dark (or black) box 220; such bins are referred to as detection bins or bins with detections. The threshold detected bins having values that were not above the threshold are assigned a binary value of zero, and are indicated by a light (or grey) box 222; such bins are referred to as non-detection bins or bins without detections.

Each row of threshold detected bins is associated with a unique modulation period, or measurement time period, identified in a modulation period row index 228. For practical implementations, the matrix of the altitude history image would be much larger having more rows and columns. Six rows are illustrated, however in practice a greater number of rows, e.g. forty, would be used; the number of rows is selected by the designer of the RADAR altimeter 103, and for example can range between six and one hundred. A threshold detected bin column index 226 sets out the column numbers; each column is associated with a unique range gate. The number of columns is defined by the maximum range of the RADAR altimeter 103 and the resolution of the range gate. In another embodiment, the number of columns can range from two hundred and fifty to two thousand.

For pedagogical reasons, the first set 224a corresponds to gated RADAR altimeter return signals of the sling load 105, and the second set 224b corresponds to gated RADAR altimeter return signals of the surface 107. However, if the surface 107 and the sling load 105 are at the same altitude, e.g. the sling load 105 is on the surface 107, then there would only be one set of gated RADAR altimeter return signals indicative of the same range from the vehicle 101 to both of the surface 107 and the sling load 105.

The first set comprises columns one through nine. The second set comprises columns n through n+8. For pedagogical reasons, the images patterns for each the first set 224a and the second set 224b are identical; however, the images would not necessarily be identical.

The dark boxes 220 in the first set 224a and the second set 224b represent respectively altitude history images RADAR altimeter return signals in excess of the threshold. Based upon the altitude history image of the first set 224a and the second set 224b, there are numerous ways of detecting range to, i.e. determining which range gate corresponds to, the sling load 105 and/or the surface 107. Exemplary range detection techniques include: peak detection, M out of N detection, and M out of N detection where M varies with range. Range detection is performed by the range determination system 103B-2d.

Peak detection selects the column of threshold detected bins, corresponding to a range gate, that has the maximum number of bins with detections. In one embodiment, when detecting the range to the sling load 105, the range gate having the maximum number of bins closest to the vehicle 101 will be used to ascertain the range to the sling load 105. In another embodiment, when detecting the altitude of the vehicle above the surface 107, the range gate having the maximum number of bins with detections closest to the vehicle 101, but more distant from the vehicle 101 than the full extent of the detected sling load 105 is used to ascertain the range to the surface 107, and thus the altitude of the vehicle 101. Thus, in FIG. 2, range gates 4 and n+3 correspond to the RADAR altimeter returns from sling load 105 and the surface 107, respectively.

M out of N detection refers to a process performed by a M out of N sliding window detector that determines whether there have been at least M bins with detections in a column of N bins. If N is less than K, then a window of width N bins is slid bin by bin (from one window position to the next window position) from one end to the other end of each column. For each window position within a column, the range determination system 103B-2d determines whether there are at least M bins with detections within the window. M out of N sliding window detectors are further described in Peter Williams' "Evaluating the state probabilities of M out of N sliding window detectors," DTSO Aeronautical and Maritime Research Laboratory, February 1998, which is hereby incorporated by reference in its entirety.

M and N are selected by the system designer. N may be K rows of bins, or a lesser number. In one embodiment, M may be thirty-five to one hundred percent of N.

In one embodiment, when detecting the range to the sling load 105, the range gate having at least M bins with detections in a sequence of N bins closest to the vehicle 101 will be used to ascertain the range to the sling load 105. In another embodiment, when detecting the altitude of the vehicle above the surface 107, the range gate having at least M bins with detections in a sequence of N bins closest to the vehicle 101, but more distant from the vehicle 101 than the full extent of the detected sling load 105 is used to ascertain the range to the surface 107, and thus the altitude of the vehicle 101.

M out of N detection where M varies with altitude refers to a process like M out of N detection, however M varies with range. In one embodiment, M is between thirty-five to one hundred percent of N at ranges of one thousand feet or less, and is between twenty and fifty percent at ranges greater than one thousand feet. This allows for system performance parameters such as sensitivity and probability of erroneous detection to be tuned by the designer throughout the full operating range of the altimeter.

Figure 3:
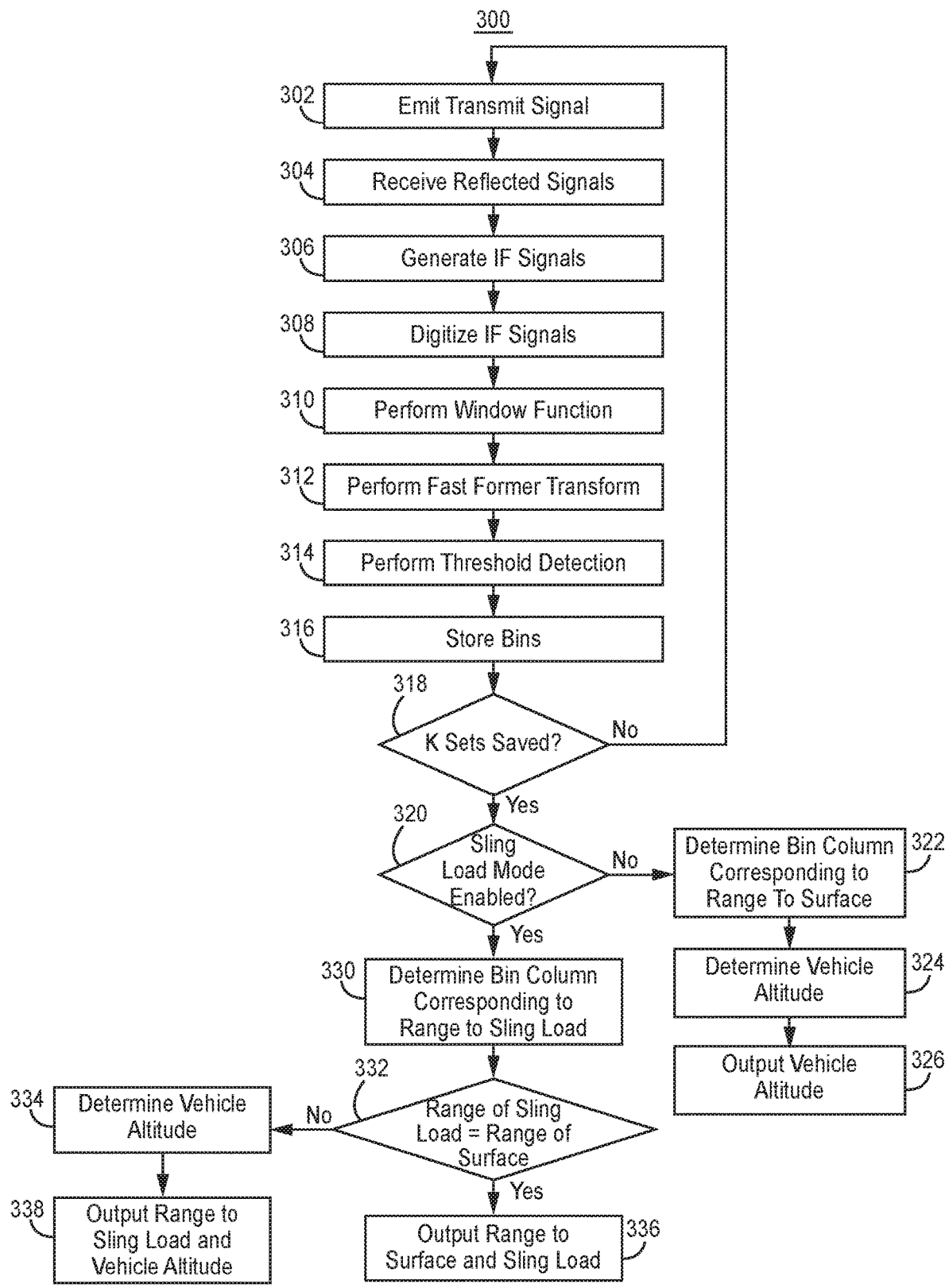
FIG. 3 illustrates one embodiment of an altitude and sling load range determination method.

FIG. 3 illustrates one embodiment of an altitude and sling load range determination method 300. To the extent that the embodiment of method 300 shown in FIG. 3 is described herein as being implemented in the systems exemplified by FIGS. 1 and 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner).

In block 302, a transmit signal 104A is emitted, e.g. from the RADAR altimeter 103, for a single modulation period. In one embodiment, the transmit signal 104A is generated in the transmitter circuit 103A, and coupled to an antenna for emission.

In block 304, reflected signals are received, e.g. by the RADAR altimeter 103, corresponding to the single modulation period. In one embodiment, amplify the received reflected signals. In another embodiment, the reflected signals are received by an antenna and communicatively coupled to the detector system 103D.

In block 306, generate IF signals that are the difference between the transmit signal (e.g. a portion of the transmit signal 104A that was not emitted and for example is coupled to the mixing circuit 103D-1 through the circulator 103C) and the received, reflected signal(s), e.g. with the mixer circuit 103D-1. In one embodiment, in block 308, digitize the IF signals, e.g. with the analog to digital converter 103D-3.

In one embodiment, in block 310, perform a window function on the digitized IF signals prior to performing a discrete Fourier transform to reduce artifacts generated by the subsequent discrete Fourier transformation. In another embodiment, use a window function that is a cosine window function such as a Hamming or Hann window function. In a further embodiment, the cosine window function may be applied by multiplying the IF signal by the corresponding window function, e.g. in the processing system 103B. In yet another embodiment, the window function is a multiplication factor applied to the digital output of the analog to digital converter 103D-3. In yet a further embodiment, the window function can be implemented in the FFT system 103B-2b.

In block 312, perform a fast Fourier transformation of the IF signals; generate a set, e.g. row, of FFT bins for the corresponding modulation period. Each bin corresponds to a unique range gate for a unique modulation period. In one embodiment, perform the fast Fourier transformation using the FFT system 103B-2b. In block 314, perform threshold detection for each generated FFT bins, e.g. using the threshold detection system 103B-2a, so that each bin is classified as a detection or a non-detection bin. In block 316, store the set, e.g. row, of detection and non-detection bins generated during threshold detection, e.g. in the history system 103B-2c.

In block 318, determine if K sets of detection and non-detection bins, or K rows of bins, have saved, e.g. in the history system 103B-2c. If K rows of bins have not been saved, then return to block 302. If K rows of bins have been saved, then, in block 320, determine if a sling load mode is enabled. Sling load mode is enabled, e.g. upon switch activation or sling mode enablement signal generation by the sensor circuit 108 as described above.

If the sling load mode is not enabled, then in block 322, determine a set of bins corresponding to a unique range gate but different modulation periods, e.g. a bin column, corresponding to the range to the surface 107, e.g. the set, or bin column, closest to the vehicle 101 using one of the aforementioned range detection techniques. Then, in block 324 determine the altitude of the vehicle 101 above the surface 107. Numerous techniques may be used to determine altitude, and may depend upon the utilized range detection technique. In one embodiment, the range to and/or altitude above the surface 107 is determined by the range determination system 103B-2d.

In one embodiment, altitude is equal to an altitude constant (that is the range gate resolution) multiplied by the threshold detected bin column index number for threshold detected bin column representative of a range closest to the vehicle 101. For example, using the altitude history image 200 of FIG. 2 and peak detection, column n+3 of the second set 224b has the largest number of detection bins: six. Therefore, the altitude equals (n+3) multiplied by the altitude constant, which may be 3.088 feet/bin.

The column number with the peak, or largest, number of detection bins, e.g. closest to the vehicle 101, may be referred to as the index of the peak sum. The number of detections of each column may be referred to as the column sum. The column sum for the column having the largest number of detections, e.g. closest to the vehicle 101, is referred to as the peak column sum.

In another example, also using the altitude history image 200 of FIG. 2 and peak detection, the altitude is also determined based upon column n+3. However, altitude is determined with the following equation:

$$\text{Altitude} = \begin{Bmatrix} \text{Altitude} \\ \text{Constant} \end{Bmatrix} \times \begin{Bmatrix} \text{Index of Peak} \\ \text{Sum} - 1 \end{Bmatrix} + \frac{\text{Peak Column}}{\text{Peak Column} + \text{Column Sum of}} \\ \text{Sum} + \text{Peak Index} - 1 \end{Bmatrix}$$

Note, that a bin column identified as the range to surface 107 (or for that matter range to sling load 105) need not necessarily be the exact altitude of the vehicle 101 (or the range of the sling load 105).

Again, the altitude constant is assumed, e.g., to be 3.088 feet/bin. In the example illustrated in FIG. 2, column index of peak sum−1 is column (n+3)−1, or column n+2. Using the example illustrated in FIG. 3, the altitude=3.088×((n+2)+(6/(6+2))) feet.

In a further example, calculate an average altitude that is the sum of Y altitude determinations divided by Y. Each altitude determination may be calculated using one of the exemplary techniques above, or by another technique. Then, in one embodiment, in block 326, output the determined altitude, or average altitude, of the vehicle 101, e.g. using the I/O(s) 109.

If the sling mode is enabled, then in block 330, determine a set of bins, corresponding to a unique range gate but different modulation periods, such as a bin column, corresponding to the range to the sling load 105, e.g. the bin set, or column, closest to the vehicle 101 using one of the aforementioned range detection techniques. The range detection technique used in blocks 322 and 330 need not be the same.

For example, if peak detection is used, multiply the altitude constant by the column index associated with the peak response. Thus, with respect to FIG. 2, the column index corresponding to the range of the sling load 105 is column index 4. Assuming, for example, an altitude constant of 3.088 feet/bin, then the range of the sling load is 12.352 feet.

In block 332, determine whether the range of the sling load 105 equals the range to the surface 107. For example, determine if the bin columns corresponding to the range to the sling load 105 and the range to the surface 107 are the same. In one embodiment, sequentially analyze the bin columns (corresponding to ranges more distant from the vehicle 101) following the bin column identified in block 330. Ascertain if each satisfies the same range detection technique used in block 330. Upon identifying the first bin column, following the identified bin column, ascertain if there are any other bin columns (corresponding to ranges more distant form the vehicle 101) that satisfy the same range detection technique. If the ranges are equal, in one embodiment, determine the altitude of the vehicle 101. If the ranges are not equal, determine the bin column corresponding to the range to the surface, as described above in block 322.

If the range of the sling load 105 equals the range to the surface 107, then in block 336, output the range to the surface 107 and to the sling load 105. If the range of the sling load 105 does not equal the range to the surface 107, then in block 334, determine the altitude of the vehicle 101, e.g. as exemplified above in block 324. For example, determine the altitude, and possibly the average altitude, of the vehicle 101, e.g. as exemplified above in block 324. Then, in block 338 output the range to the sling load 105 and the altitude, e.g. determined and/or averaged, of the vehicle 101. In one embodiment, output such information using the I/O(s) 109. In one embodiment, after blocks 326, 336, and 338, each threshold detected bin in the altitude history image 200 is set to a zero value, and the process repeats starting at block 302.

The methods and techniques used by systems of altimeter 100 including the controller 110 described above can be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

The terms row and columns are relative in nature, and may be interchanged depending upon the orientation of the altitude history image. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A RADAR altimeter, configured to be mounted on a vehicle, comprising:
    at least one antenna configured to emit a transmit signal for a single modulation period and to receive at least one reflected signal for the single modulation period;
    a transmitter circuit coupled to the at least one antenna;
    a detector system comprising:
        a mixer circuit coupled to the at least one antenna, and configured to generate at least one intermediate frequency (IF) signal from the received at least one reflected signal;
        a high pass filter, coupled to an output of the mixer circuit, configured to filter the IF signals so that the at least one IF signal has a constant amplitude from the lowest to the highest frequencies;
        analog to digital converter circuitry, coupled to an output of the high pass filter, configured to digitize the at least one IF signal; and
    processing circuitry, coupled to the detector system and the transmitter circuit, configured to:
        perform a discrete Fourier transformation of the digitized at least one IF signals generating a series of bins where each bin corresponds to a unique range gate for the single modulation period;
        perform threshold detection for each bin in the series of bins so that each bin is classified as a detection or a non-detection bin;
        store the set of detection and non-detection bins in an altitude history image;
        determine that K sets of detection and non-detection bins have been saved;
        after determining that K sets of detection and non-detection bins have been saved, determine that the sling load mode has been enabled; and
        after determining that the sling load mode has been enabled, then:
            determine a set of bins, corresponding to a unique range gate but different modulation periods, wherein the unique range gate corresponds to a range from the vehicle to the sling load;
            determine that a range to a surface from the vehicle does not equal the range to the sling load from the vehicle; and
            after determining that the range to the surface from the vehicle does not equal the range to the sling load from the vehicle, then determine vehicle altitude.

2. The RADAR altimeter of claim 1, further comprising a circulator;
    wherein the at least one antenna is a single antenna coupled to the circulator; and wherein the circulator is further coupled to the detector system and transmitter circuit.

3. The RADAR altimeter of claim 2, wherein the single antenna comprises at least one patch.

4. The apparatus of claim 1, wherein the transmitter is configured to generate a transmit signal having a fixed modulation rate.

5. The apparatus of claim 1, wherein the range determination system is configured to determine range using at least one of: peak detection, M out of N detection, and M out of N detection where M varies with range.

6. A system, comprising
a RADAR altimeter, configured to be mounted on a vehicle, comprising:
at least one antenna configured to emit a transmit signal for a single modulation period and to receive at least one reflected signal for the single modulation period;
a transmitter circuit coupled to the at least one antenna;
a detector system comprising:
a mixer circuit coupled to the at least one antenna, and configured to generate at least one intermediate frequency (IF) signal from the received at least one reflected signal;
a high pass filter, coupled to an output of the mixer circuit, configured to filter the at least one IF signal so that the at least one IF signal have a constant amplitude from the lowest to the highest frequencies;
analog to digital converter circuitry, coupled to an output of the high pass filter, configured to digitize the at least one IF signal;
processing circuitry, coupled to the detector system and the transmitter circuit, configured to:
perform a discrete Fourier transformation of the digitized at least one IF signals generating a series of bins where each bin corresponds to a unique range gate for the single modulation period;
perform threshold detection for each bin in the series of bins so that each bin is classified as a detection or a non-detection bin;
store the set of detection and non-detection bins in an altitude history image;
determine that K sets of detection and non-detection bins have been saved;
after determining that K sets of detection and non-detection bins have been saved, determine that the sling load mode has been enabled; and
after determining that the sling load mode has been enabled, then:
determine a set of bins, corresponding to a unique range gate but different modulation periods, wherein the unique range gate corresponds to a range from the vehicle to the sling load;
determine that a range to a surface from the vehicle does not equal the range to the sling load from the vehicle; and
after determining that the range to the surface from the vehicle does not equal the range to the sling load from the vehicle, then determine vehicle altitude; and
at least one input/output device coupled to the RADAR altimeter.

7. The system of claim 6, further comprising a sensor circuit configured to generate the sling load mode enablement signal.

8. The system of claim 6, wherein the at least one input/output device is configured to generate the sling load mode enablement signal.

9. The system of claim 6, wherein the RADAR altimeter further comprises a circulator;
wherein the at least one antenna is a single antenna coupled to the circulator; and
wherein the circulator is further coupled to the detector system and transmitter circuit.

10. The system of claim 9, wherein the single antenna comprises at least one patch.

11. The system of claim 6, wherein the discrete Fourier transform is a fast Fourier transform.

12. The system of claim 6, wherein the transmitter is configured to generate a transmit signal having a fixed modulation rate.

13. The system of claim 6, wherein the range determination system is configured to determine range using at least one of: peak detection, M out of N detection, and M out of N detection where M varies with range.

14. The RADAR altimeter of claim 1, wherein
after determining the vehicle altitude, then output the range to the sling load from the vehicle and the determined vehicle altitude.

15. The RADAR altimeter of claim 1, wherein the processing circuitry is further configured to perform a window function on the digitized IF signals.

16. The RADAR altimeter of claim 1, wherein the discrete Fourier transform is a fast Fourier transform.

17. The system of claim 6, wherein
after determining the vehicle altitude, then output the range to the sling load from the vehicle and the determined vehicle altitude.

18. The system of claim 6, wherein the processing circuitry is further configured to perform a window function on the digitized IF signals.

19. The system of claim 1, wherein the processing circuitry is further configured to:
after determining that K sets of detection and non-detection bins have been saved, determine that the sling load mode has not been enabled;
after determining that the sling load mode has not been enabled, then:
determine a set of bins, corresponding to a unique range gate but different modulation periods, wherein the unique range gate corresponds to the vehicle's range to a surface; and
determine an altitude of the vehicle above the surface.

20. The system of claim 6, wherein the processing circuitry is further configured to:
after determining that K sets of detection and non-detection bins have been saved, determine that the sling load mode has not been enabled;
after determining that the sling load mode has not been enabled, then:
determine a set of bins, corresponding to a unique range gate but different modulation periods, wherein the unique range gate corresponds to the vehicle's range to a surface; and
determine an altitude of the vehicle above the surface.

* * * * *